United States Patent
Shibayama (10) Patent No.: US 6,678,789 B2
(45) Date of Patent: Jan. 13, 2004

(54) MEMORY DEVICE

(75) Inventor: Atsufumi Shibayama, Tokyo (JP)

(73) Assignee: NEC Corporation, Tokyo (JP)

( * ) Notice: Subject to any disclaimer, the term of this patent is extended or adjusted under 35 U.S.C. 154(b) by 328 days.

(21) Appl. No.: 09/824,677

(22) Filed: Apr. 4, 2001

(65) Prior Publication Data

US 2001/0029571 A1 Oct. 11, 2001

(30) Foreign Application Priority Data

Apr. 5, 2000 (JP) .................................... P2000-103567

(51) Int. Cl.[7] .............................................. G06F 12/00
(52) U.S. Cl. ....................................................... 711/117
(58) Field of Search ................................ 711/117, 118, 711/122

(56) References Cited

U.S. PATENT DOCUMENTS 6,078,992 A * 6/2000 Hum ........................... 711/122
2003/0074530 A1 * 4/2003 Mahalingaiah et al. ..... 711/117

FOREIGN PATENT DOCUMENTS

| JP | 03-84641 | 4/1991 |
| JP | 05-2534 | 1/1993 |
| JP | 05-324466 | 12/1993 |
| JP | 06-103167 | 4/1994 |
| JP | 06-222990 | 8/1994 |
| JP | 06-301600 | 10/1994 |
| JP | 08-36491 | 2/1996 |

OTHER PUBLICATIONS

Handy, J. "The Cache Memory Book," Academic Press, Inc., San Diego, California (1993), pp. 62–84.*

* cited by examiner

*Primary Examiner*—Matthew Kim
*Assistant Examiner*—Woo H. Choi
(74) *Attorney, Agent, or Firm*—Sughrue Mion, PLLC (57) ABSTRACT

When a load command is issued, first it is decided whether or not the subject address of the load command is stored in a storage buffer. If a hit occurs in the storage buffer, in other words if data is present which has this address, this data is output as load data. On the other hand, if no hit occurs in the storage buffer, a decision is made as to whether or not said data is stored in a cache memory, and if said data is thus stored then, along with this data being read out as load data, the load data which has been read out from this cache memory is stored in the storage buffer.

2 Claims, 10 Drawing Sheets

MEMORY DEVICE

BACKGROUND OF THE INVENTION

1. Field of the Invention

The present invention relates to a memory device which comprises a storage buffer and a cache memory, and more particularly relates to a memory device designed to achieve enhanced performance and reduced electrical power consumption.

2. Description of Related Art Including Information Disclosed Under 37 CFR 1.97 and 37 CFR 1.98

In conventional microprocessors, in order to increase the speed of data access to main memory which is of high capacity but low speed, the microprocessors have been widely practiced of providing a cache memory which is of low capacity but high speed, thereby suppressing data access latency. In particular, in recent years, the difference between the processing speed of the microprocessor and the external processing speed of the chips in the main memory etc. has gradually become remarkable, and the tendency has been to include a cache memory of greater and greater capacity in the processor.

Further, with programs which consume large quantities of data such as involved in multimedia processing, a cache memory with a large number of ports is provided, since the cache memory is required to supply a large quantity of data at one time, and microprocessors have also become more common which are capable of simultaneously processing access by a plurality of load commands or store commands, and of simultaneously processing access by a load command or a store command and data transfer between the main memory and the cache memory. In implementing such a multi-port cache memory, the cost upon the layout area is high if the memory cells themselves are made as multi-port. For this reason the cache memory is normally divided into smaller units, termed banks, and a bank interleave method is adopted for simultaneously processing accesses to each bank. In this case, it becomes possible to process accesses to different banks simultaneously.

Normally, when a load command has been issued to a cache memory such as described above, processing is completed in a single pipeline stage, because cache tag reading out and hit decision, and reading out of cache data, are performed in parallel. On the other hand, when a store command has been issued, the data only comes to be actually written after the cache tag reading out and the hit decision have been performed, and it has been determined whether or not writing is possible and the cache way for which writing should be performed. Due to this, more processing time is taken for a store command than for a load command, and in general two or more pipeline stages are required. As a result, when a store command and a load command have been issued in sequence, the processing speed undesirably drops because the pipeline timings of accesses to the cache memory do not properly agree.

In order to solve the above problem, there is a type of microprocessor which, as well as having a cache memory, is equipped with a so called storage buffer which contains the store data due to store commands. In a microprocessor equipped with such a storage buffer, store data due to a store command is temporarily stored in the storage buffer, and pipeline timing adjustment for load commands and store commands becomes possible due to writing being performed from the storage buffer into the cache memory, so that it is possible to ensure good processing speed even for store commands.

Further, with a microprocessor equipped with the above described storage buffer, efficiency is attained even for speculative store commands due to branch commands or the like.

For example, in recent years the practice of performing speculative execution of commands based upon a branch forecast mechanism has become widespread, in order to execute pipeline operation for branch commands smoothly. In this branch forecast mechanism the destination of the branch is forecast, and the commands at the forecast destination of the branch are speculatively executed before the address of the destination of the branch is actually determined.

In this case, it is necessary to cancel the commands which have been speculatively executed when the forecast for the branch destination proves to be mistaken. However, it is not easy to cancel the result of a store command which has been written into the cache memory. By contrast, it is easy to cancel the result of a store command which has been written into the storage buffer. Accordingly the data stored by a speculative store command is temporarily stored in the storage buffer, and is only written into the cache memory from the storage buffer after it has been verified that the branch forecast has succeeded, while if the branch forecast proves to be mistaken it is sufficient to perform cancellation of this data stored by the speculative store command in the storage buffer. By doing this, it becomes possible to forecast the destination of the branch before the destination of the branch is actually verified, and speculatively to execute the commands at the forecast destination of the branch which include the store command.

Further, the store data which is stored in the storage buffer is the most recent data. Due to this, for subsequent load commands for the same address, it becomes possible to read out this data from the storage buffer, rather than from the main memory or the cache memory. Normally the storage buffer is equipped with a mechanism which presents to subsequent load commands the store data which have been stored in the storage buffer. Further, if a plurality of store commands have been issued for the same address, it is necessary to protect the store data for the earlier store commands in the storage buffer so that they are not destroyed by the store data for the subsequent store commands. For this reason, such a storage buffer is usually implemented as a first-in first-out (FIFO) buffer, and is controlled so that writing into the cache memory is performed in order from the store data of the store command which was issued first. Moreover, details of such storage buffers are disclosed, for example, in Japanese Unexamined Patent Applications, First Publication Nos. Hei 6-301600 and Hei 8-36491.

As described above, in application to a portable information terminal or the like, on the one hand the demands upon the microprocessor for reduction of electrical power consumption are becoming more and more strident, and on the other hand there is the problem that the proportion of the consumption of electrical power by the microprocessor due to the cache memory becomes greater, because of elevation of the operating frequency and increase of the capacity of the cache memory and increase in the number of its ports and the like.

Further, if the number of access requests to the cache memory which are simultaneously generated is greater than the number of ports possessed by the cache memory, then, since it becomes necessary to compel one or more of these accesses to wait until a port becomes free, there is the problem that the processing performance is to this extent deteriorated.

Yet further, when implementing a multi-port cache memory according to the bank-interleave method, when so-called bank conflict is generated in which several attempts are made to access the same bank simultaneously, then, since it becomes necessary to process these accesses one at a time in order, there is the problem that the processing performance is to this extent deteriorated.

BRIEF SUMMARY OF THE INVENTION

In light of the above problem, an object of the present invention is to provide a memory device which, along with reducing the electrical power consumption due to the cache memory, also reduces the proportion of port conflicts and bank conflicts which occur, thus alleviating the reduction of processing capability entailed thereby.

In order to attain the above-mentioned object, the present invention provides a memory device which comprises a storage buffer which temporarily maintains store data for a cache memory or a main memory, and in which, if load data has been read out from said cache memory by a load command, said load data is stored in said storage buffer.

Since by doing this the hit ratio of the storage buffer when executing load commands is improved and the number of accesses to the cache memory is reduced, the improved efficiency is obtained that it is possible to reduce the consumption of electrical power by the cache memory.

Further, in this memory device, it is beneficial that, when the load data which have been read out from said cache memory by said load command is stored in said storage buffer, if a vacant entry exists in said storage buffer, said load data is stored in said vacant entry by said load command; while, if no vacant entry exists in said storage buffer, and moreover any entries in which load data is stored exist in said storage buffer, said load data is stored in any one of said entries by said load command; and, if no vacant entry exists in said storage buffer, and moreover no entries in which load data is stored exist in said storage buffer, said load data is not stored in said storage buffer by said load command.

Further, in this memory device, it is beneficial that, when store data is stored in said storage buffer by a store command: if an entry exists in said storage buffer in which store data or load data are stored of which the address is identical to the subject address of said store command, then said store data is stored in said entry by said store command; if no entry exists in said storage buffer in which store data or load data are stored of which the address is identical to the subject address of said store command, and moreover a vacant entry exists in said storage buffer, then said store data is stored in said vacant entry by said store command; and, if no entry exists in said storage buffer in which store data or load data are stored of which the address is identical to the subject address of said store command, and moreover no vacant entry exists in said storage buffer, and moreover any entry exists in said storage buffer in which load data is stored, then said store data is stored by said store command in any one of said entries in which load data is stored.

Since doing this it is possible to use the entries in the storage buffer effectively, the probability is increased that a load command or a store command which is issued subsequently should make a hit in the storage buffer. Since as a result the frequency of accesses to the cache memory is reduced, it is possible to reduce the consumption of electrical power during access.

Moreover, if store data is stored in all the entries, and the addresses of all the store data are different, then it will be acceptable to terminate the execution of the store command until a vacant entry is available.

Further, in this memory device, if during the execution of said load command it becomes apparent that store data or load data whose address is the same as the subject address of said load command is stored in said storage buffer, then it is beneficial that said store data or load data is read out from said storage buffer and is transferred as the result of the execution of said load command.

Further, in this memory device, if during the execution of said load command it becomes apparent that store data or load data whose address is the same as the subject address of said load command is stored in said storage buffer, then it is beneficial that access to said cache memory and said main memory is terminated in the time period during which said store data or load data is being read out from said storage buffer and is being transferred as the result of the execution of said load command.

Further, in this memory device, it is beneficial that, during the execution of a store command of which the subject is only a portion of the bytes within a word, when storing the store data for said store command in said storage buffer, if an entry exists in said storage buffer in which store data or load data are stored of which the address is identical to the subject address of said store command, and also store data is stored by said store command in said entry, then store data is stored by said store command in the byte positions which are designated as the store subject of said store command, while the contents of the byte positions which are not designated as the store subject of said store command are kept at their previous values without being overwritten.

By doing this, it is ensured that always only the most recent data is stored in the storage buffer. Even if it happens that data for the same address as one whose data cannot be overwritten has been supplied as store data and it is necessary to write it into a different entry, it becomes possible to use the entry effectively, since the store data can be overwritten for the same address, by contrast with the prior art in which the entry could not be effectively used.

Further, in this memory device, it is beneficial that, during the execution of a store command of which the subject is only a portion of the bytes within a word, when storing the store data for said store command in said storage buffer, if no entry exists in said storage buffer in which store data or load data are stored of which the address is identical to the subject address of said store command, and moreover a vacant entry exists within said storage buffer, then the data whose address is identical with the subject address of said store command is read out from said cache memory or said main memory, and said data is stored in the byte positions which are not designated as the store subject of said store command, while store data is stored by said store command in the byte positions which are designated as the store subject of said store command.

By doing this, it becomes possible to store in the storage buffer store data for which the entire word is valid and which moreover is the most recent, even if no hit has occurred for the store command in the storage buffer. Due to this, the efficiency is obtained that the probability of a hit in the storage buffer by a subsequent load command is enhanced.

Further, in this memory device, it is beneficial that store data is not stored in some of the entries in said storage buffer, and only load data is stored therein.

Since by doing this it is possible, when executing a load command, securely to store in the storage buffer the load data which has been read out from the cache memory, therefore it is possible further to increase the probability of hits in the storage buffer by subsequent load commands.

Further, in this memory device, it is beneficial that, when writing store data which have been stored in said storage buffer from said storage buffer into said cache memory, writing is performed into said cache memory in any order from among those of said store data which are stored in said storage buffer which have become writable.

Since by doing this it is possible to utilize the vacant entries in the storage buffer efficiently, accordingly it is possible to reduce the deterioration of processing performance due to the storage buffer becoming full of store data and the execution of commands being terminated. Further, the probability of subsequent load commands hitting in the storage buffer is enhanced, since the frequency of storing load data in the storage buffer when executing a load command is increased.

According to the above structure, the storage buffer is searched when executing a load command, and, if store data or load data is present whose address is the same as the subject address of loading, then transfer of this data as load data from the storage buffer is performed, and no access is made to the cache memory. In other words, in comparison with the prior art, the number of accesses to the cache memory comes to be reduced by the proportion in which hits occur upon load data which is stored in the storage buffer. Since the capacity of the storage buffer is very much less than that of the cache memory, the consumption of electrical power during access to it is less. Accordingly, the efficiency is obtained that it is possible to reduce the consumption of electrical power by reducing access to the cache memory.

Further, if load data for a load command has been read out from the cache memory, this load data is stored in the storage buffer. Usually it is quite frequent for load data to be reloaded by a load command, by contrast with the case of data which has been stored by a store command being loaded by an immediately following load command, which is unusual.

Thus, by load data which has been read out from the cache memory being stored in the storage buffer as described above, the frequency of hits in the storage buffer for load commands is increased, and it becomes possible to reduce the frequency of accesses to the cache memory.

Further, with the memory device of the present invention, by reducing accesses to the cache memory, the frequency of generation of port conflicts in the cache memory is reduced. Moreover, even in the case of a multi-port cache memory implemented according to a bank interleave method, the probability of generation of bank conflict is reduced by the reduction of accesses to the cache memory.

As a result it becomes possible to implement a memory device comprising a cache memory, in which the hardware cost and the consumption of electrical power are reduced, and in which moreover the probability of generation of port conflict and bank conflict is small.

Further, since the frequency of generation of port conflicts for the cache memory is reduced by reducing the number of accesses to the cache memory, it is possible to suppress deterioration of processor performance caused by port conflict.

And, furthermore, in the case of a memory device comprising a cache memory which is a multi-port memory implemented according to a bank interleave method, since the probability of generation of bank conflict is reduced by reduction of accesses to the cache memory, it is possible to suppress deterioration of performance caused by port conflict.

As a result, it is possible to reduce the consumption of electrical power when accessing the cache memory, and further, since the rate of generation of bank conflicts and port conflicts is also reduced, the efficiency is obtained of making it possible to maintain processing power.

DETAILED DESCRIPTION OF THE INVENTION

Figure 1:
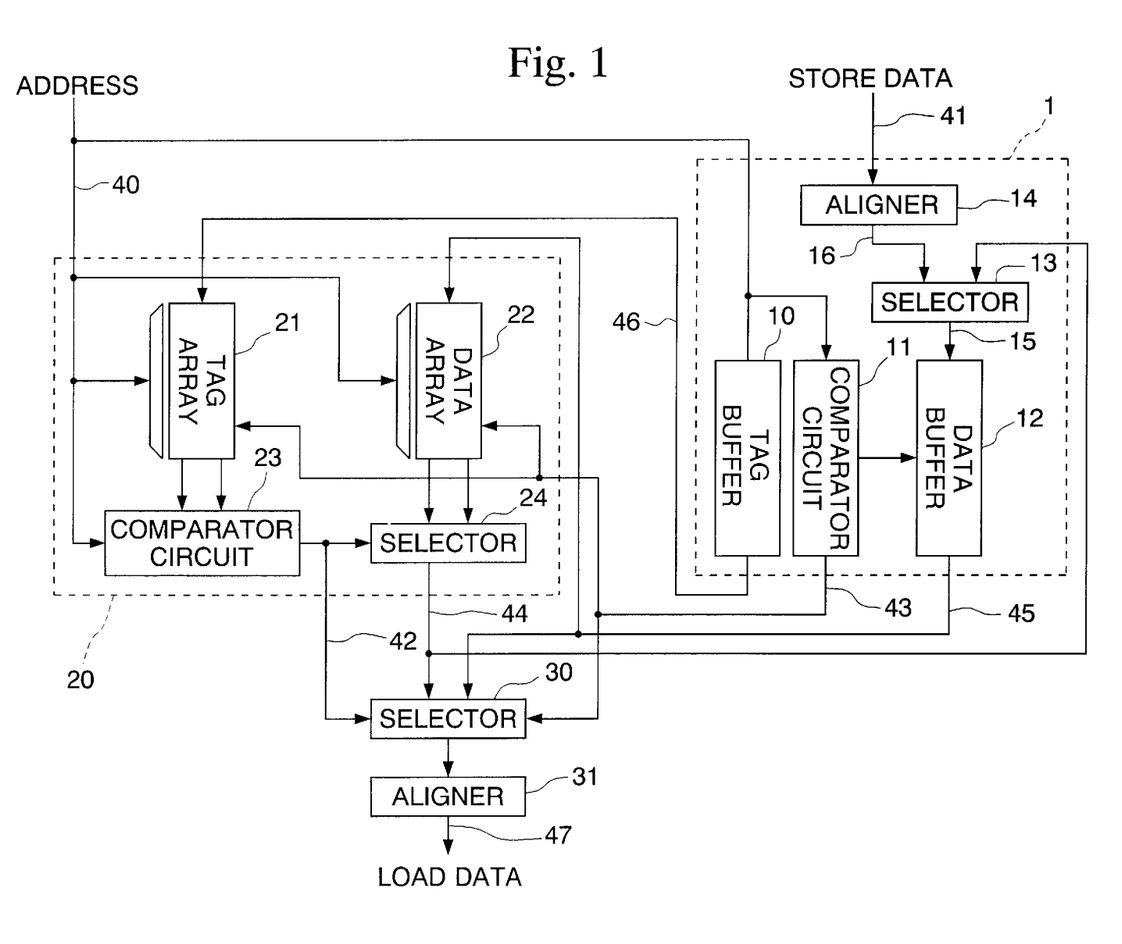
FIG. 1 is a block diagram showing the structure of a memory device according to a first embodiment of the present invention.

Next, preferred embodiments of the present invention will be explained in detail with reference to the figures. FIG. 1 is a block diagram showing the structure of a memory device according to a first preferred embodiment of the present invention. In this figure, the memory device comprises a storage buffer 1, a cache memory 20, a selector 30, and an aligner 31.

In the above described storage buffer 1, a tag buffer 10 maintains valid and invalid bits for each entry in said storage buffer 1, and the word addresses of the store data and the load data which are stored in its entries. It should be noted that by "word address" is meant the address in word units, with the offset portion within the word deleted or ignored from the byte address which is the address in normal byte units. A comparator circuit 11 decides whether or not the subject address of a store command or a load command is stored in said storage buffer 1, and outputs a signal based upon the result of this decision. The data buffer 12 maintains the store data or the load data which is stored in this storage buffer 1 in word units. By doing this, the storage buffer 1 maintains in word units the store data or the load data which have been lined up to word address boundaries. The storage buffer 1 further comprises a selector 13 and an aligner 14.

Further, in the cache memory 20, a tag array 21 maintains the addresses and the line states etc. of the cache lines which are stored in said cache memory 20, and a data array 22 maintains the data of these cache lines which are stored in the cache memory 20. A comparator circuit 23 decides whether or not the subject address of a load command or a store command is stored within said cache memory 20, and a selector 24 outputs data from the data array 22 based upon the output of the comparator circuit 23.

Now, for the cache memory 20 and the storage buffer 1 of the above structure, the sequence of events when a load command has been issued will be explained with reference to FIGS. 2 and 3. It should be understood that the execution of the load command is performed in two successive clock cycles, as shown in clock signal of FIG. 2 and clock signal of FIG. 3.

First, when the load command is issued, in the first clock cycle the subject address of the load command (in the following, termed the "load command subject address") is input via the address line 40 to the tag array 21, the data array 22, and the comparator circuit 23 in the cache memory 20, and to the tag buffer 10 and the comparator circuit 11 in the storage buffer 1 (load address 40 of FIG. 2). Next, in the storage buffer 1, the addresses stored in each entry in the tag buffer 10 are compared by the comparator circuit 11 with the load command subject address. It should be noted that this comparison is performed for each entry in parallel. In the event of a result, i.e. in the case of a hit in the storage buffer 1 when the address which is stored in some entry agrees with the load command subject address, then the comparator circuit 11 outputs a hit signal to the cache memory 20 and the selector circuit 30 via the data buffer 12 and the signal line 43 (store buffer hit signal 43 of FIG. 2).

Figure 2:
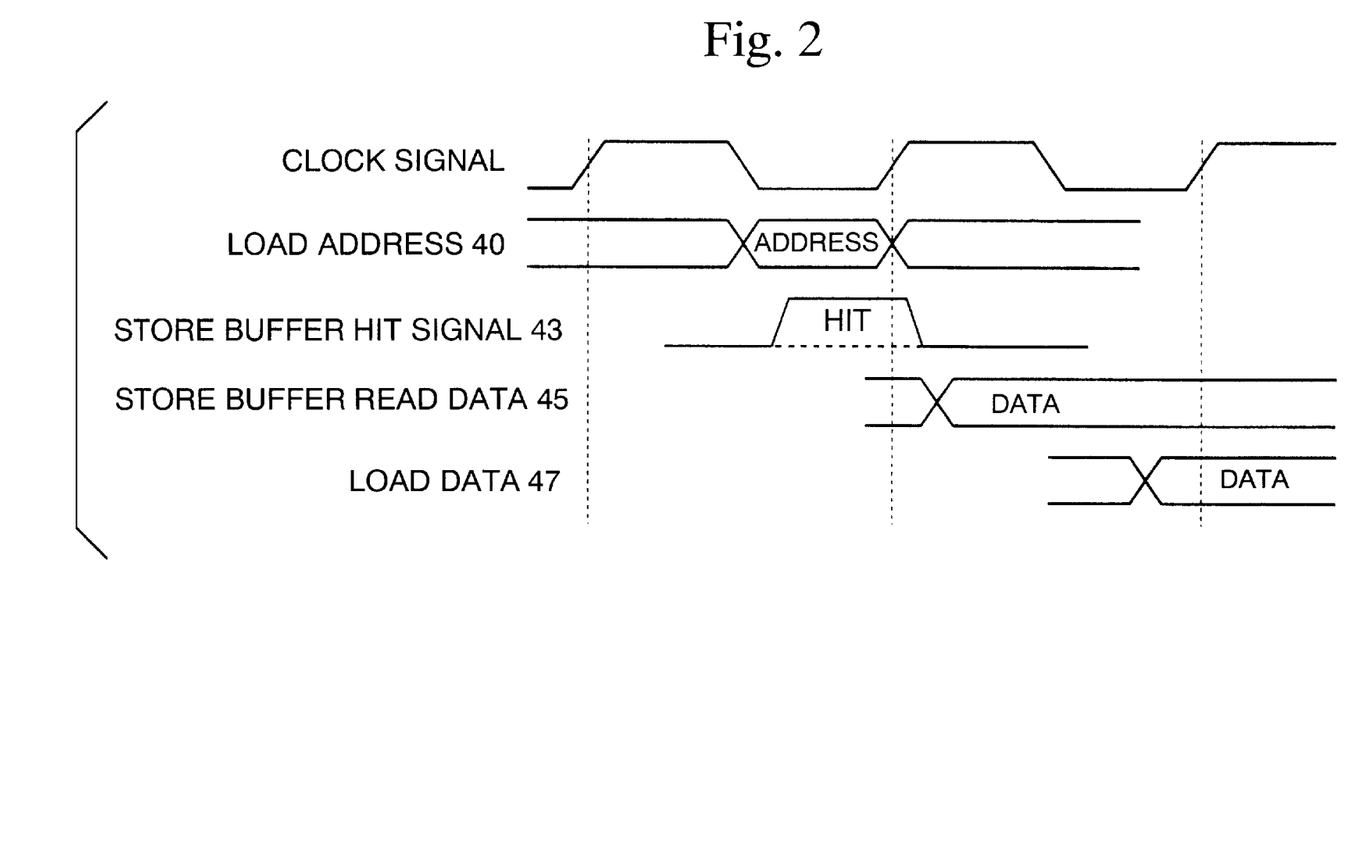
FIG. 2 is a timing chart showing the operation when a hit has occurred in a storage buffer during the execution of a load command, according to the first embodiment.

When the hit signal from the comparator circuit 11 has been input to the data buffer 12, in the second clock cycle the data buffer 12 outputs to the selector circuit 30 via the data line 45 the load data or store data which are stored within the entry which has been hit (store buffer read data 45 of FIG. 2). When the hit signal is inputted to the selector circuit 30 via the data line 43 from the comparator circuit 11, and also the data read out from the data buffer 12 by the data line 45 is supplied, then the selector circuit 30 outputs this read out data to the aligner circuit 31. The aligner circuit 31 performs lining up of the read out data as required, and transfers it via the data line 47 as load data (load data of FIG. 2).

In this connection, when the cache memory 20 inputs a hit signal from the comparator circuit 11 via the data line 43, it recognizes that a hit in the storage buffer 1 has occurred, and it terminates the read out operation due to the load command. This is accompanied by stopping of the clock signal within the cache memory, stopping of address latch operation, stopping of sense amplifier operation, and the like.

Figure 3:
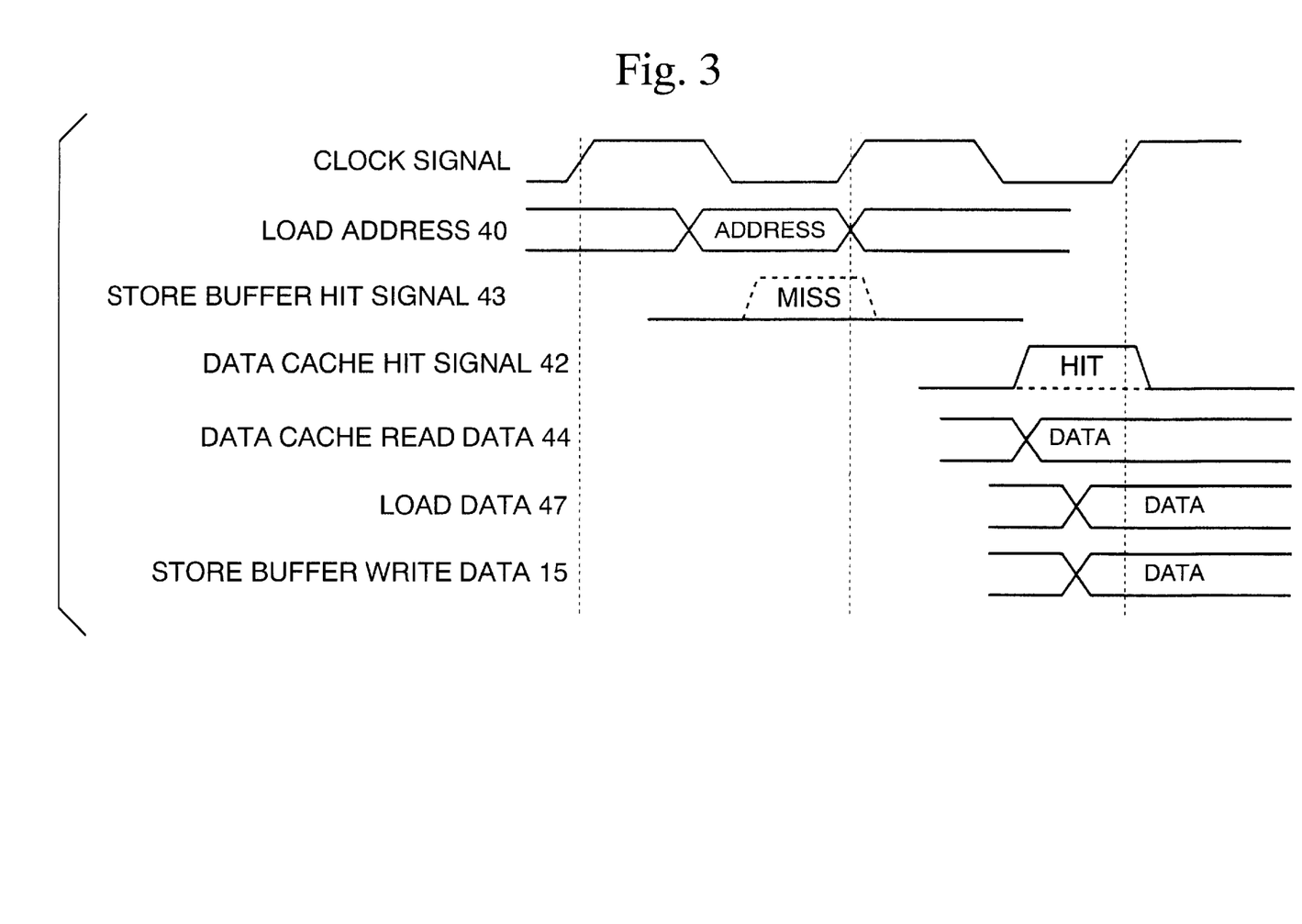
FIG. 3 is a timing chart showing the operation when a miss has occurred in the storage buffer during the execution of a load command, according to the first embodiment.

On the other hand, if no address which agrees with the load command subject address has been found to be stored in any entry in the tag buffer 10, in other words if a miss has occurred in the storage buffer 1, then no hit signal is output by the comparator circuit 11 in the first cycle (store buffer hit signal 43 of FIG. 3). Due to this, the cache memory 20 recognizes that a miss has occurred in the storage buffer 1. In this case, the cache memory 20 performs the following operations in the second clock cycle.

First, the tag array 21 searches for the tag which indexes the bits of a portion of the address which has been input via the address line 40, and extracts said tag and outputs it to the comparator circuit 23. Further, simultaneously with this, the data array 22 outputs the data to the selector circuit 24. It should be understood that, for a cache memory of the directly mapped type, the tag and data which are output here each are one in number, while for a cache memory of the set associative type only the associated number is output.

The comparator circuit 23 compares the tag which has been read out from the tag array 21 with the load command subject address which has been input via the signal line 40, and outputs the result of this comparison via the signal line 42 to the selector circuits 24 and 30 (data cache hit signal 42 of FIG. 3). Based upon the result of this comparison of the tag which has been input from the comparator circuit 23, the selector circuit 24 selects, from among the data which has been read out from the data array 22, the data corresponding to the address which has been hit by the comparator circuit 23, and outputs it via the data line 44 to the selector circuit 30 and to the selector circuit 13 in the storage buffer 1 (data cache read data 44 of FIG. 3).

The selector circuit 30 outputs to the aligner circuit 31 the data which are read out from the cache memory 20 via the data line 44. The aligner circuit 31 performs lining up of the read out data as required, and transfers it via the data line 47 as load data (load data of FIG. 3).

Simultaneously, in the storage buffer 1, storage operation is performed for the data which has been read out from the cache memory 20. In concrete terms, the data which has been read out from the cache memory 20 is input to the data buffer 12 via the data line 44 and the selector circuit 13 (store buffer write data 15 of FIG. 3).

Further, the address of this data is input to the tag buffer 10 via the address line 40. If any vacant entries are available in the storage buffer 1, the above described data and address are stored in one of these vacant entries. If there is no vacant entry, but there are entries in which load data is stored, then the above described data and address are stored in one of these entries. If store data is stored in all the entries in the storage buffer 1, then no such storage is performed, since there is no vacant entry and also there is no entry in which load data is stored.

Further, it may happen that data which is stored in the storage buffer 1 may be transferred by a subsequent load command whose subject address is the same. Since in this case access to the cache memory 20 is terminated as explained earlier, additional efficiency is obtained, because the consumption of electrical power is diminished, and the frequency of occurrence of port conflict and bank conflict is reduced.

Figure 4:
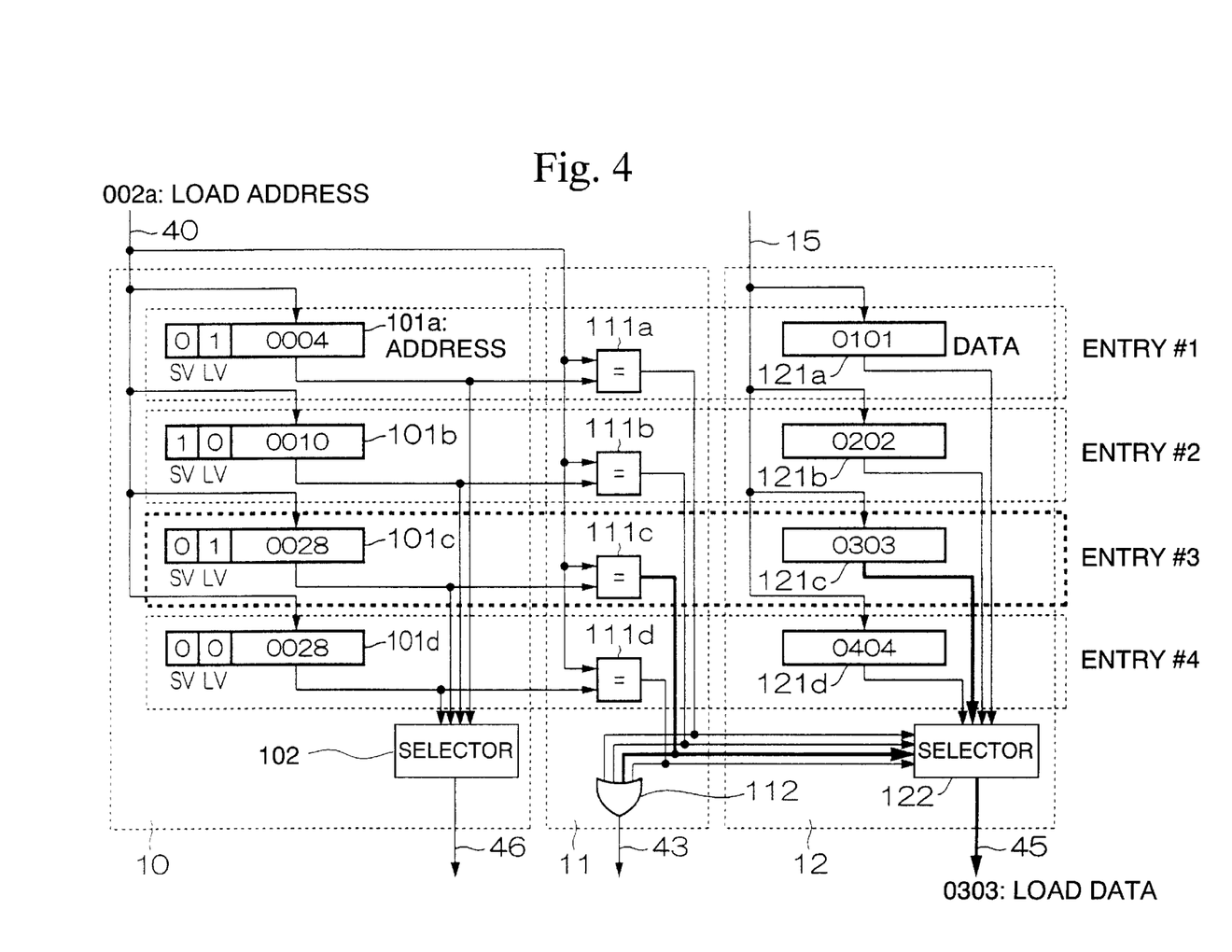
FIG. 4 is a diagram showing a concrete example of the operation of the storage buffer for the execution of a load command, according to the first embodiment.

Next, the operation of the storage buffer 1 described above will be explained in detail using a concrete example. FIG. 4 is a figure showing the detailed structure of the storage buffer 1. It should be noted that here it is supposed that the number of entries in this storage buffer 1 is 4, and that each entry in its data buffer 12 consists of 2-byte data.

Referring to FIG. 4, the tag buffer 10 comprises tags 101*a* through 101*d* for four entries and a single selector circuit 102.

The tags 101*a* through 101*d* are made up from three regions: a store data valid bit SV, a load data valid bit LV, and an address region. If the store data valid bit SV is "1", then this means that store data is stored in this entry, while if the store data valid bit SV is "0", then this means that store data is not stored in this entry. In the same manner, if the load data valid bit LV is "1", then this means that load data is stored in this entry, while if the load data valid bit LV is "0", then this means that load data is not stored in this entry. The address region stores the word address portion of the address of the load data or the store data which is input via the address line 40. The selector circuit 102 selects the address from each entry and outputs it to the address line 46.

The comparator circuit 11 comprises comparators 111a through 111d for the four entries, and an OR circuit 112. The comparators 111a through 111d compare the addresses of the entries which are input from the tag buffer 10 and the word address portion of the address which is provided by the address line 40, and output the results of these comparisons to the OR circuit 112 and the data buffer 12. The OR circuit 112 outputs a hit signal to the signal line 43 if any one of the entries agrees, by taking the logical sum of the comparison results for the entries.

The data buffer 12 comprises buffers 121a through 121d for the four entries, and a selector circuit 122. The buffers 121a through 121d keep the load data or store data input from the data line 15. The selector circuit 122 outputs to the data line 45 the data for the entry which has been hit, based upon the result of comparison from the comparator circuit 11.

For example, for the tag 101a of the present entry #1, the value in the store data valid bit SV is "0", the value in the load data valid bit LV is "1", and the 16-bit word address in the address region is "0004" in hexadecimal format, while the data value "0101" is stored in the data buffer 121a for entry #1. This means that in entry #1 there is stored the load data "0101" for the address "0004". Here, it is supposed that one word is made up of two bytes, with the third through the sixteenth bits within each sixteen bit address giving the word address, while the first and the second bit select the byte within that word.

In the same manner, since for the tag 101b of entry #2 the value in the store data valid bit SV is "1", the value in the load data valid bit LV is "0", and the word address in the address region is "0010", while the data value "0202" is stored in the data buffer 121b for entry #2, this means that in entry #2 there is stored the store data "0202" for the address "0010".

In the same manner, for the tag 101c of entry #3 the value in the store data valid bit SV is "0", the value in the load data valid bit LV is "1", and the word address in the address region is "0028", while the data value "0303" is stored in the data buffer 121c for entry #3, and this means that in entry #3 there is stored the load data "0303" for the address "0028". On the other hand, although the word address stored in the address region of the tag 101d of entry #4 is "0028", the values stored in the store data valid bit SV and in the load data valid bit LV are both "0", and this means that neither load data nor store data is stored in this entry #4.

The sequence of events that occur with this storage buffer in which the above described tags and data are stored, when a load command for the address "002a" has been issued, will now be explained.

First, the subject address "002a" of the load command is input via the address line 40 to the comparators 111a through 111d which are provided for each entry. Each comparator 111a through 111d decides whether or not the address which is stored in the tag for its entry agrees with the subject address "002a", and also decides whether or not the load data valid bit LV of the tag is "1" or the store data valid bit SV is "1".

It should be noted that, since the comparators 111a through 111d according to this embodiment compare the word addresses, in other words the third through the sixteenth bits of the addresses, therefore, in actual detail, the subject address "002a" of the load command will agree with "0028", "0029", "002a", and "002b".

Since the result is that the address of the tag stored in entry #3 is "0028", and moreover the load data valid bit LV is "1", therefore it is decided that the load command subject address agrees with "002a", and the comparator 111c outputs a hit signal to the OR circuit 112 and to the selector 122.

On the other hand, although the address "002a" agrees with the address "0028" which is stored in entry #4, since both the load data valid bit LV and the store data valid bit SV of entry #4 are "0" and therefore neither load data nor store data are stored in entry #4, accordingly the comparator 111d for entry #4 does not output any hit signal.

As a result, the selector circuit 122 outputs the data "0303" which is stored in the data buffer 121c for entry #3 as load data to the data line 45, based upon the hit signal for entry #3 from the comparator 111c.

Next the sequence of events that occur when a load command for the address "0020" is issued, for example, with the addresses and data stored in the entries #1 through #4 still in the same state as above, will now be explained. First, the load command subject address "0020" is input via the address line 40 to the comparators 111a through 111d which are provided for each entry. Each of the comparators 111a through 111d decides that the result of comparison between the address stored in its entry and the address which is input is that they do not agree, and therefore none of them outputs a hit signal. Accordingly no hit signal is output to the signal line 43, and as a result it comes about that the load command for the address "0020" accesses the cache memory 20.

Figure 5:
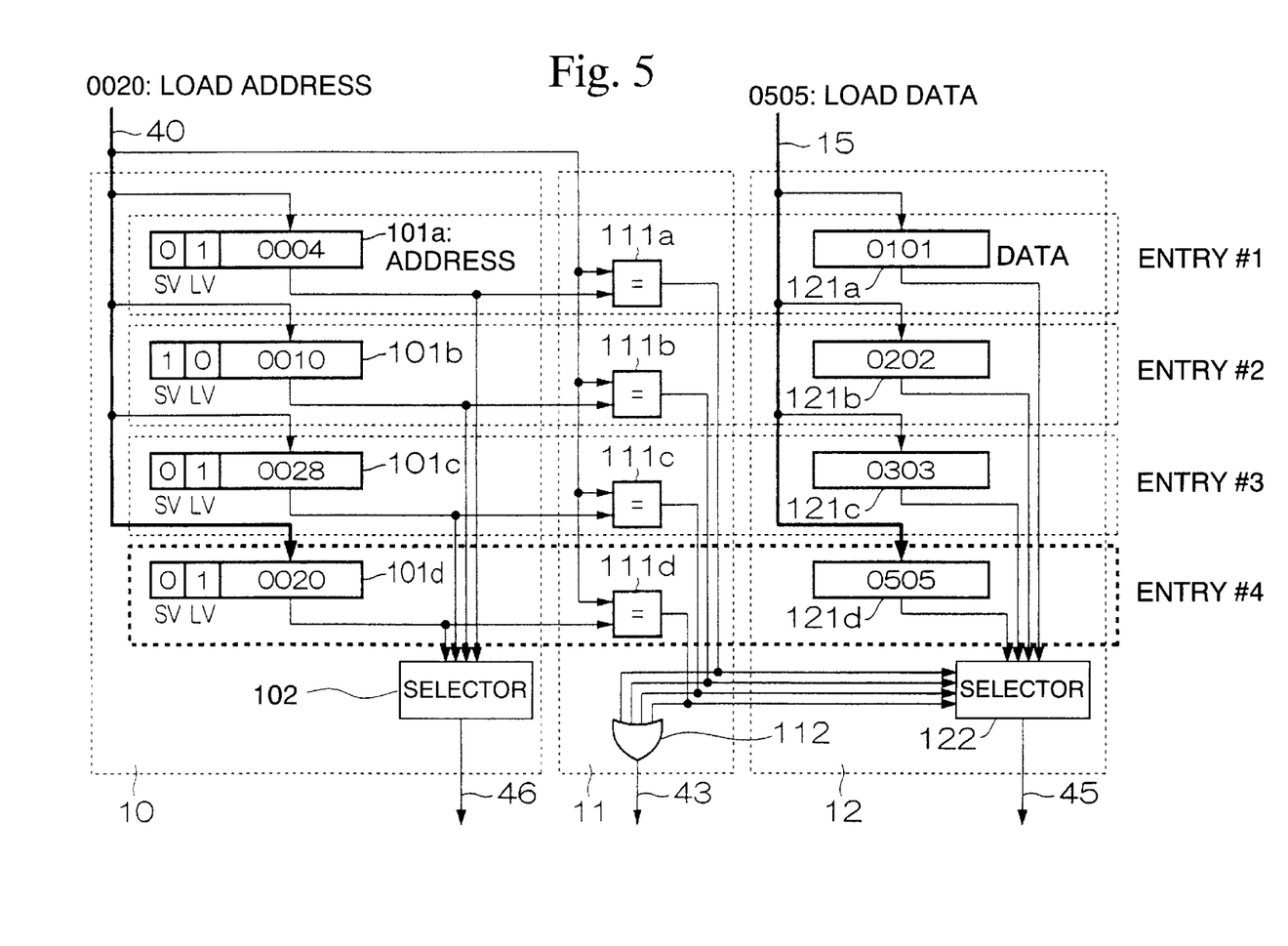
FIG. 5 is a diagram showing another concrete example of the operation of the storage buffer for the execution of a load command, according to the first embodiment.

It will be supposed that the result of accessing the cache memory 20 is a hit and that the load data value "0505" is read out. The load data that has been read out from the cache memory 20 is input to the data buffer 12 via the data line 15, as shown in FIG. 5.

Here if, as with entry #4, an entry exists in which neither load data nor store data is stored, then the load data which has been read out from the cache memory 20 is stored in this entry. In detail, as shown in FIG. 5, the subject address "0020" of the load data command is stored in the address region of the tag 101d of entry #4, "1" is stored in its load data valid bit LV, "0" is stored in its store data valid bit SV, and the load data "0505" is stored in the data buffer 121d for entry #4.

In this manner, if a miss has occurred in the storage buffer 1 and data has been read out from the cache memory 20, the probability of a hit in the storage buffer 1 for a subsequent identical load command is increased by storing this data in a vacant entry of the storage buffer 1.

Figure 6:
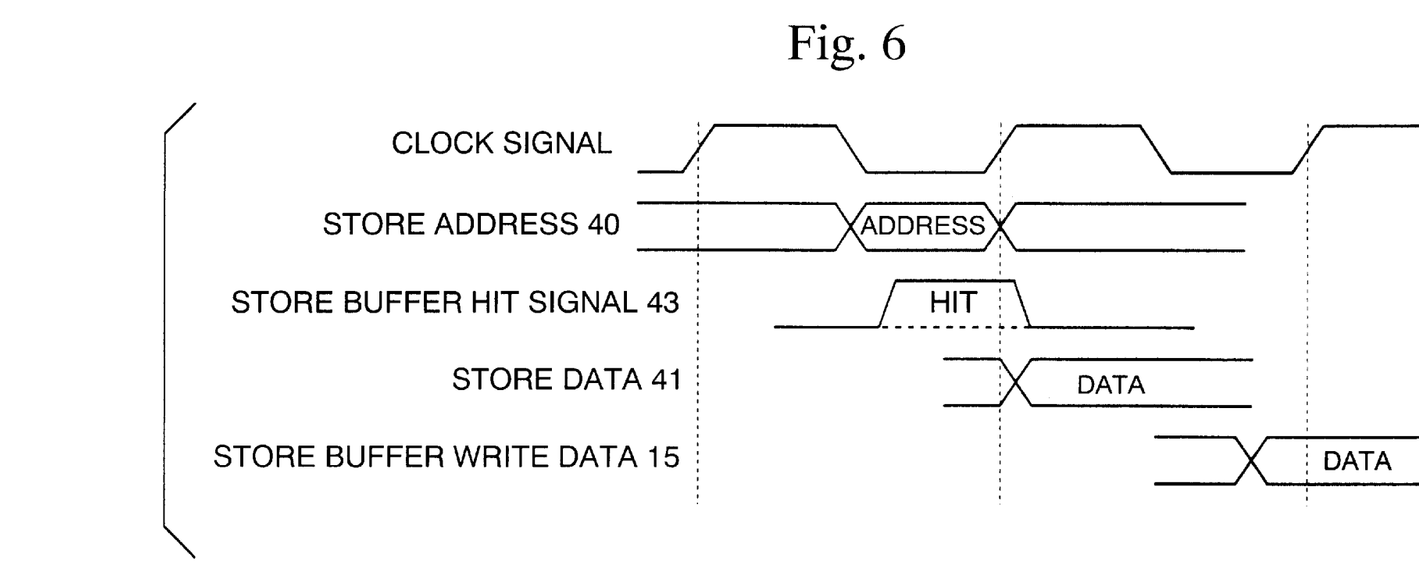
FIG. 6 is a timing chart showing the operation when a hit has occurred in the storage buffer during the execution of a store command, according to the first embodiment.

Next, the sequence of events that occur when a store command has been issued will be explained with reference to FIG. 6. It should be understood that the execution of the store command takes place over two successive clock cycles, just as with the load command described above.

First, when the store command is issued, in a first clock cycle the subject address of the store command (hereinafter termed the "store command subject address") is input (store address 40 of FIG. 6) via the address line 40 to the tag array 21, the data array 22, and the comparator circuit 23 of the cache memory 20, and to the tag buffer 10 and the comparator circuit 11 of the storage buffer 1.

Next, the address stored in each entry in the tag buffer 10 and the store command subject address are compared by the comparator circuit 11 in the storage buffer 1. It should be understood that this comparison is performed for each entry in parallel. If the result is that the address stored in one of these entries agrees with the store command subject address, i.e. in the event of a hit in the storage buffer 1, then the comparator circuit 11 outputs (store buffer hit signal 43 of FIG. 6) a hit signal via the data buffer 12 and the signal line 43 to the cache memory 20 and the selector circuit 30.

When the hit signal from the comparator circuit 11 is input to the data buffer 12, in the second clock cycle, the writing of the store data is performed into this entry which has been hit. In concrete terms, the store data is supplied to the storage buffer 1 via the data line 41 (store data 41 of FIG. 6), and is input to the data buffer 12 via the aligner circuit 14, the selector circuit 13, and the data line 15 in the storage buffer 1 (store buffer write data 15 of FIG. 6). It should be understood that the address of the store data is stored in the tag buffer 10 simultaneously with storage of the store data in the data buffer 12, since this address of the store data is input to the tag buffer 10 via the address line 40.

Moreover, it may happen that only a portion of the bytes in a word are designated as the subject of storage in the store command. In storing a store command of this type in the storage buffer 1, usually the store data is presented in the data line 41 arranged as formatted in the descending byte direction. Due to this, after the byte position for storage being moved by the aligner circuit 14 to the byte position within the word which is designated by the store command subject address, in the data buffer 12, writing in (overwriting) is only performed for the byte position for storage within the word.

In the following, the sequence of events that occur when a store command has been issued which designates only a portion of the bytes in a word as the subject of storage will be explained in detail with reference to FIG. 7. It will be supposed in this example that, as shown in FIG. 7, the word length is 32 bits and the byte length is 8 bits, so that each word contains 4 bytes; and these bytes will be referred to, starting with the least significant byte, as the zeroth byte, the first byte, the second byte, and the third byte.

In other words, if from the least significant bit the 32 bits in each word are termed the zeroth bit, the first bit, . . . the 31st bit, then (byte position in word data of FIG. 7) the 8 bits from the zeroth bit through the 7th bit will be termed the zeroth byte, the 8 bits from the 8th bit through the 15th bit will be termed the first byte, the 8 bits from the 16th bit through the 23rd bit will be termed the second byte, and the 8 bits from the 24th bit through the 31st bit will be termed the third byte.

Figure 7:
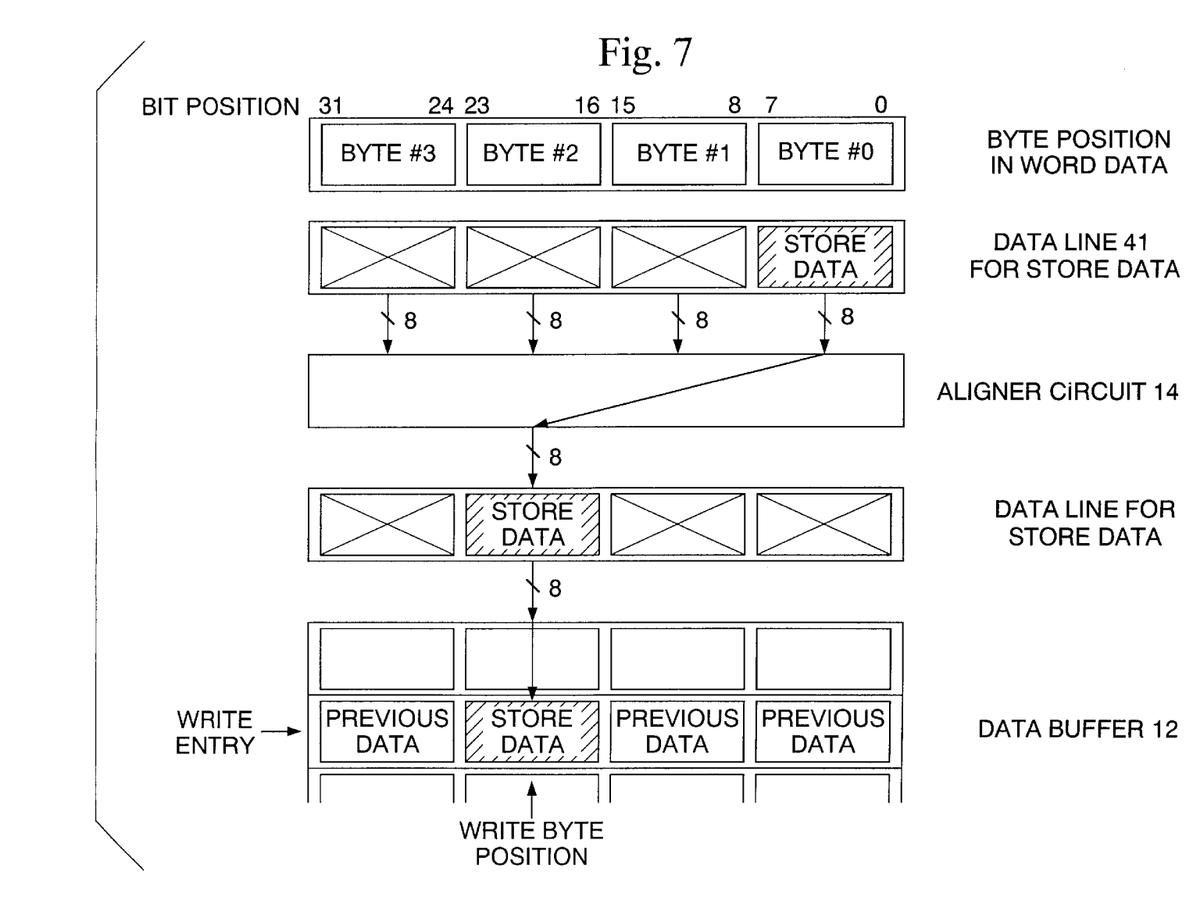
FIG. 7 is an explanatory figure for explanation of the data structure when only a portion of the bytes are to be written into the storage buffer, according to the first embodiment.

If it is supposed that, for the byte data described above, a store command has been issued which performs storage in the second byte position only, then the byte data of the store subject are input via the data line 41 to the aligner circuit 14 in the format as arranged in the descending byte direction as shown in data line 41 for store data of FIG. 7, i.e. in the format with the store data stored in the zeroth byte position. The aligner circuit 14 moves (aligner circuit 14 of FIG. 7) the store data provided in the zeroth byte position to the byte position for storage, i.e. to the second byte position. It should be understood that the byte position of the store subject can be obtained from the lowermost 2 bits, i.e. from the zeroth bit and the first bit, of the store command subject address. Further, the data stored in byte positions other than those in which the store data is stored is arbitrary.

When the store data has been moved by the aligner circuit 14 to the byte position in which it should be stored, said store data is input to the data buffer 12 after it has been input to the selector 13 via the signal line 16. The data buffer 12 performs storage in the entry in which the data for the same word address is stored. However, what is stored is not all the bytes in the entry, but is only the second byte of the store subject, while it will be supposed that for the other byte positions the previous values are maintained without any change. By doing this it is ensured that the store data which is stored in the storage buffer 1 always consists of words which are entirely valid and moreover are the most recent ones, even in this case that a store command has been issued which performs storage only in a portion of a byte. In other words, it becomes possible to transfer data from the storage buffer 1 for a load command which loads an entire subsequent word.

Next, the sequence of events that take place when a miss has occurred in the storage buffer when executing the above described store command, i.e. when the address which agrees with the store command subject address is not stored in any entry in the tag buffer 10, will be explained with reference to FIG. 8.

Figure 8:
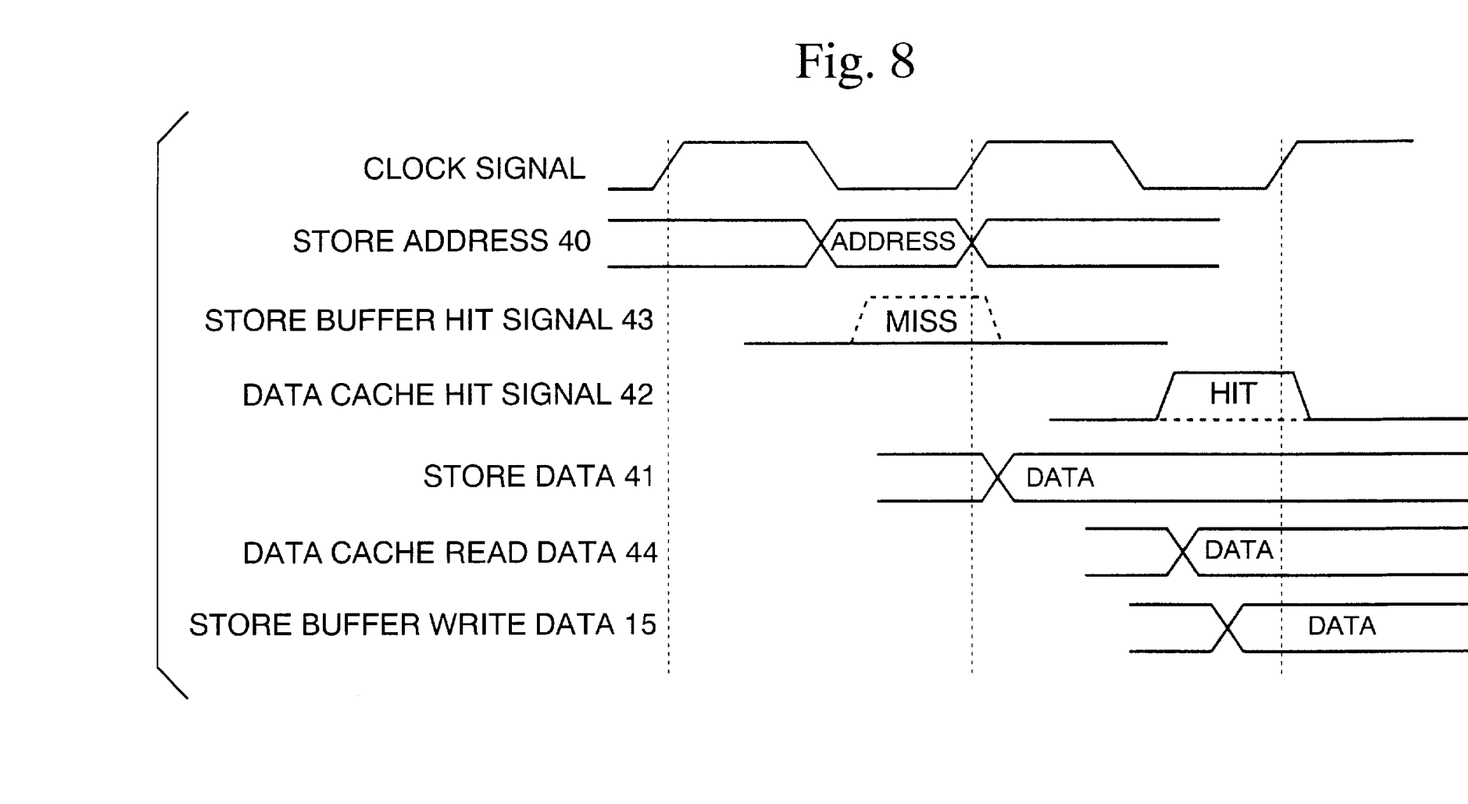
FIG. 8 is a timing chart showing the operation when a miss has occurred in the storage buffer during the execution of a store command, when only a portion of the bytes are to be written into the storage buffer, according to the first embodiment.

First, if a miss has occurred in the storage buffer 1, no hit signal is outputted by the comparator circuit 11 in the first clock cycle (store buffer hit signal 43 of FIG. 8).

Here, if the store command which has been issued is a store to an entire word, then the store data provided in the data line 41 is stored in the data buffer 12, and further the address provided in the address line 40 is stored in the tag buffer 10. Moreover, the entry of the tag buffer and the data buffer to store is an entry which is empty, or an entry which is not empty and in which load data is stored.

On the other hand, if the store command which has been issued is not a store to an entire word but has as its subject a specified byte only, then in the second clock cycle the cache memory 20 is accessed. In the cache memory 20, first, the tag array 21 searches out the tag which indexes a portion of the bits of the address which was inputted via the address line 40, and extracts these tags and outputs them to the comparator circuit 23. Further, simultaneously with this, the data array 22 outputs the data to the selector circuit 24.

The comparator circuit 23 compares the tag read out from the tag array 21 and the store command subject address which has been inputted via the signal line 40, and outputs the result obtained by this comparison via the signal line 42 to the selector circuits 24 and 30 (data cache hit signal 42 of FIG. 8). Based upon the result of comparison which has been inputted from the comparator circuit 23, the selector circuit 24 selects the data from among the data read out from the data array 22 which correspond to the address which was hit by the comparator circuit 23, and outputs it via the data line 44 to the selector circuit 30 and the selector circuit 13 in the storage buffer 1 (data cache read data 44 of FIG. 8).

On the other hand the store data of the store subject is inputted to the aligner 14 in the storage buffer 1 in the second clock cycle, irrespective of whether or not a hit has occurred in the storage buffer. Since this store data is presented in the data line 41 in arranged format, it is output to the selector circuit 13 after having been moved to the byte position stored by the aligner circuit 14, as shown in data line 41 for store data of FIG. 7. The selector 13 combines the store data which have been input by the aligner circuit 14 and the data which have been read out from the cache memory 20, and outputs them to the data buffer 12 via the signal line 15; and, in the data buffer 12, the store data which have been input are stored either in a vacant entry, or in an entry which is not an empty entry but in which load data is stored (store buffer write data 15 of FIG. 8).

Figure 9:
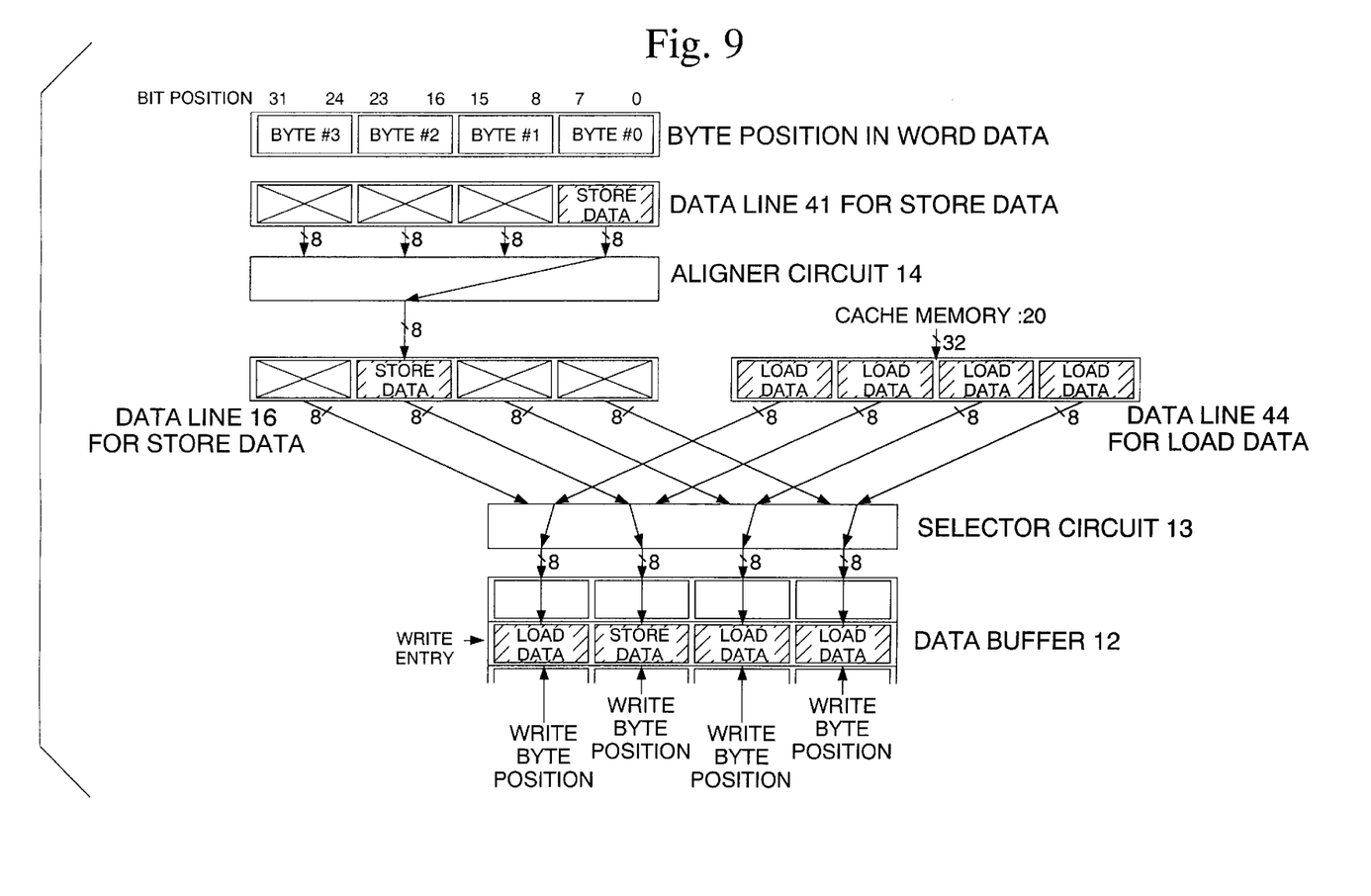
FIG. 9 is an explanatory figure for explanation of the data structure when a miss has occurred in the storage buffer during the execution of a store command, when only a portion of the bytes are to be written into the storage buffer, according to the first embodiment.

In the following, the sequence of events that take place when a store command has been issued which designates only a portion of the bytes in a word as the subject of storage, and also a miss has occurred in the storage buffer, will be explained in detail with reference to FIG. 9. It should be understood that the word length and the byte length are supposed to be the same as in the case shown in FIG. 7.

For example, now suppose that a store command has been issued to perform storage only in the second byte position. The byte data to be stored, arranged in the descending byte direction format, are presented in the zeroth byte position of the data line 41 (data line 41 for store data of FIG. 9). The aligner circuit 14 moves the byte data which have been presented in the zeroth byte position and which are to be stored to the address position in which they are to be stored, in other words to the second byte position (aligner circuit 14 of FIG. 9).

Further, simultaneously with this, the previous data at the same address is read out from the cache memory 20 on the data line 44. The entire word of the data, in other words all the bytes, are valid. The selector circuit 13 selects the output of the aligner circuit 14 for the byte position for which storage is to be performed, in other words for the second byte, and for the other bytes selects the data on the data line 44, and outputs to the data buffer 12 (selector circuit 13 of FIG. 9).

Accordingly, the data in the data buffer 12 which is valid for the entire word and which is the most recent is output. The data buffer 12 stores this entire data item, in other words all the bytes thereof. By doing this, even if a store command has been issued which performs storage only of a portion of the bytes, it is ensured that the store data which is stored in the storage buffer 1 is always data for which the entire word is valid and which is the most recent. In other words, it is possible to transfer data from the storage buffer 1 with a subsequent load command which loads an entire word.

In the above, the operation according to a first preferred embodiment of the present invention has been explained for load commands and store commands, for when a hit has occurred in the storage buffer 1 and for when a miss has occurred in the storage buffer 1, and for when a hit has occurred in the cache memory 20.

Moreover, if a miss has occurred in the storage buffer 1 and also a miss has occurred in the cache memory 20 as well, then, after the data which has been read out from the main memory or from a secondary cache memory has been stored in the cache memory 20, said data which has been read out from the cache memory is written into the storage buffer 1.

Meanwhile, in the same manner as with a prior art non-blocking type cache memory, it is possible first to execute items which are hit in the storage buffer 1 or in the cache memory 20 by subsequent load commands or store commands.

Furthermore, when it becomes possible to write store data which are stored in the storage buffer 1 into the cache memory 20, they are transferred into the cache memory 20 and are deleted from the storage buffer 1. Here, it may become possible to write into the cache memory 20 because the execution of the store command which stored the store data in the storage buffer 1 is confirmed and it is guaranteed that revocation of this execution has not occurred, or because the address of the store data is hit within the cache memory 20.

In more detail, output takes place from the data buffer 12 via the data line 45, and storage takes place into the data array 22 of the cache memory 20. Simultaneously, the address of this store data is output from the tag buffer 10 via the address line 46, and is stored into the tag array 21 of the cache memory 20.

Further, if a miss has occurred in the cache memory 20, in the same manner as described above when a hit occurs in the cache memory 20, after the cache line data of the address for which the miss has occurred has been stored in the cache memory 20 from the main memory or from the secondary cache memory, the address of the store data which is stored in the storage buffer 1 is stored in the cache memory 20, and is deleted from the storage buffer 1.

Further, with the storage buffer 1 of this first preferred embodiment, only one item of store data with the same address exists, and this data item is always the most recent one. Yet further, if a hit occurs in the cache memory 20, this data is an entire word; in other words, all its bytes are valid. This means that, in contrast to the case for a prior art storage buffer, writing in from any store data which has become writable into the cache memory 20 can be performed in any order. In other words, if the store data for some entry in the cache memory 20 is erroneous, while waiting for the data at this address to be written into the cache memory 20 from the main memory or the secondary cache memory, writing can be performed first for other store data which are hit in the cache memory 20. Accordingly the additional efficiency is obtained of reducing deterioration of processing performance due to the execution of commands being halted by the storage buffer becoming full of store data, since it is possible to empty entries in the storage buffer efficiently.

Moreover, although with the memory device of this first preferred embodiment it becomes impossible to perform storage of load data if store data is stored in all the entries in the storage buffer 1, by contrast it will be acceptable to obtain the entries in which load data only is stored, and to make it possible always to store load data.

Further, with the memory device according to this first preferred embodiment, although both load commands and store commands are executed in two successive clock cycles, it is possible, while some command is executing the processing of its second clock cycle, for some other command to perform the processing of its first clock cycle, since the pipeline stages for the respective cycles are independent. In other words, it is possible for a load command or a store command to be issued and to be executed in each clock cycle. Moreover, the number of clock cycles over which a load command or a store command is executed is not limited to two.

Further, although in this first preferred embodiment of the memory device according to the present invention the capacity of the tag buffer 10, the comparator circuit 11, and the data buffer 12 was four entries, this number of entries is not to be considered as limitative of the present invention.

Figure 10:
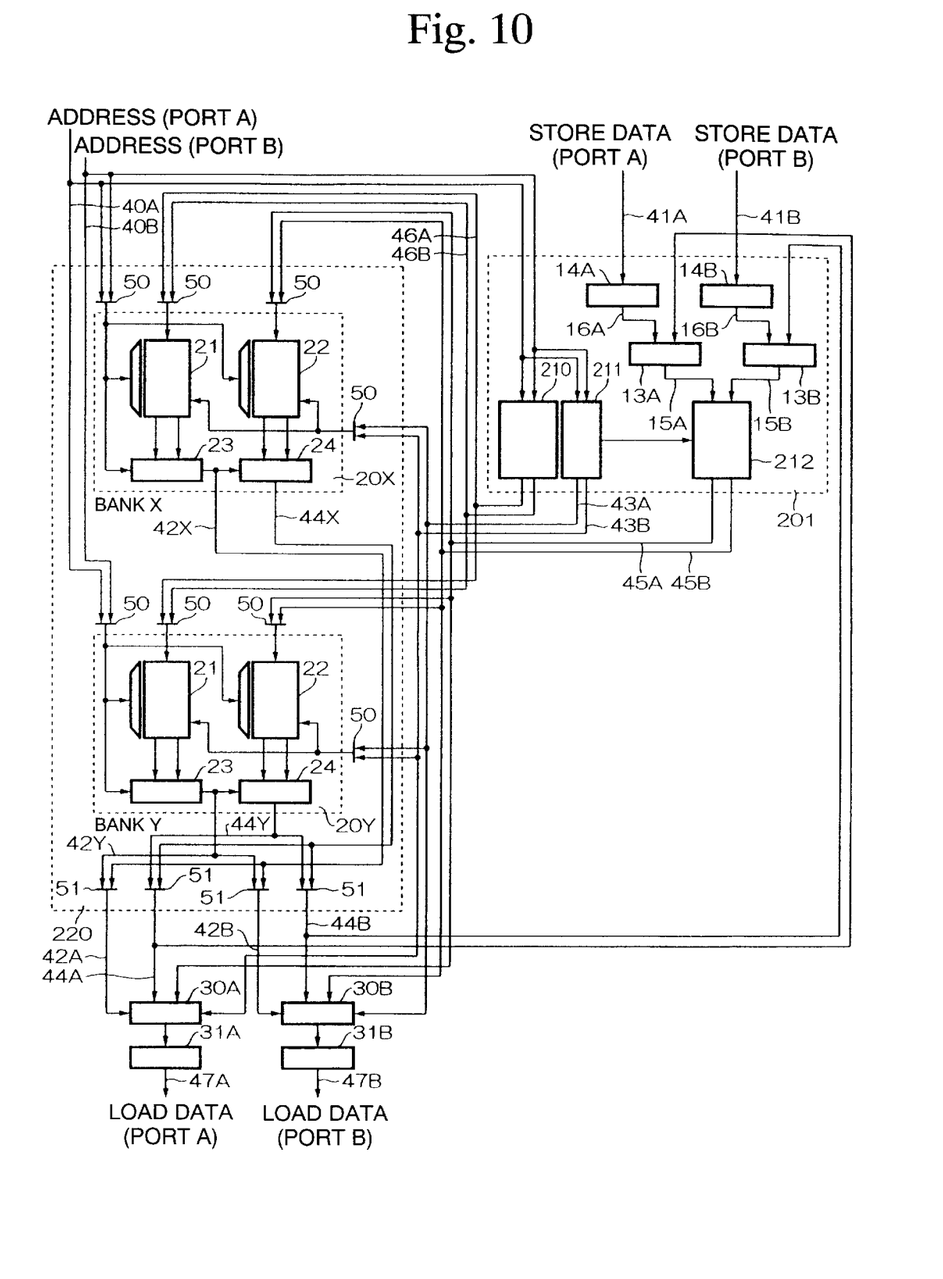
FIG. 10 is a block diagram showing the structure of a memory device according to a second embodiment of the present invention.

Next, a second preferred embodiment of the memory device of the present invention will be explained with reference to FIG. 10. This second preferred embodiment memory device comprises a storage buffer 201 which has two ports, a cache memory 220 which has two ports, selector circuits 31A and 31B for two ports each, and aligner circuits 31A and 31B for two ports each.

Further, the storage buffer 201 comprises a two port tag buffer 210, a two port comparator circuit 211, a two port data buffer 212, selector circuits 13A and 13B for two ports each, and aligner circuits 14A and 14B for two ports each; and it can process two load commands or two store commands simultaneously via the two ports A and B.

Yet further, the cache memory 220 also comprises an input selector circuit 50 and an output selector circuit 51 for two banks, bank X and bank Y Bank X and bank Y are one port cache memories, and each comprises a tag array 21, a data array 22, a comparator circuit 23, and a selector circuit 24. The input selector circuit 50 selects one or the other of 40A, 43A, 45A and 46A, and 40B, 43B, 45B and 46B, which are the respective inputs of the two ports, port A and port B, of the cache memory 220, as the input which is input to bank X or bank Y.

After 42X, 44X and 42Y, 44Y which are the outputs of bank X and bank Y have been selected between by the output selector circuit 51, they are output to the outputs 42A, 44A of port A and the outputs 42B, 44B of port B.

Since bank X and bank Y only have one port, they cannot perform processing of load commands or store commands from port A and port B simultaneously, but, since they are able to operate mutually independently, it becomes possible to simultaneously perform two processing tasks, provided that accesses from port A and port B are limited to accessing different banks. If a bank conflict is generated by accesses from the two ports trying to access the same bank, then it is necessary to make one or the other of these processing tasks wait, which entails an undesirable deterioration of performance.

In this connection, the tag buffer 210, the comparator circuit 211, and the data buffer 212 which are comprised in the storage buffer 201 all have two ports, and are always able to process two accesses simultaneously. By contrast to the case for the storage buffer 201 which can easily be made as a multi-port structure since the scale of its hardware is comparatively small, it is not realistic to manufacture the cache memory 220 entirely as a multi-port structure, since its hardware scale is by far the greater as compared with the storage buffer 201, and therefore it is usual to implement pseudo-multi-porting by dividing it into banks, as in the present example.

In this case there is a major benefit, because the reduction of generation of bank conflicts enhancing the performance.

When a load command or a store command is issued via port A or port B, first the storage buffer 201 is accessed. If a hit takes place in the storage buffer 201, processing both of a load command and a store command is terminated at this point, and the cache memory 220 is not accessed. However, if a miss has occurred in the storage buffer 201 for a load command or a store command, the cache memory 220 is accessed. In this case, if different banks are accessed via port A and port B, it becomes possible to perform processing from port A and port B simultaneously. However, a bank conflict is generated in the case of access from port A and port B to the same bank. In such a case simultaneous processing cannot be performed, and there is a reduction of processing capability, since one or the other of the tasks being processed must be forced to wait.

However, if the hit ratio in the storage buffer 201 becomes high, the number of accesses to the cache memory 220 is reduced, and accordingly the ratio of generation of bank conflicts also diminishes, so that it becomes possible to reduce deterioration of performance.

The distinguishing feature of this second preferred embodiment of the memory device of the present invention is that, if the cache memory 220 has been accessed due to a load command, the load data thereof is stored in the storage buffer 201 via the signal line 44A or 44B. Since the hit ratio in the storage buffer 201 is elevated by this, the number of accesses to the cache memory 220 is reduced, and the remarkable improvement in efficiency is attained of being able to avoid deterioration of performance due to bank conflicts.

Furthermore, since access to the cache memory 220 consumes a comparatively great amount of electrical power as compared to access to the storage buffer 201, by reducing the number of accesses to the cache memory 220, the efficiency is attained of being able to diminish the consumption of electrical power.

What is claimed is:

1. A memory device comprising a storage buffer which temporarily maintains store data for a cache memory or a main memory, wherein, if load data has been read out from said cache memory by a load command, said load data in stored in said storage buffer; and wherein:
when the load data which have been read out from said cache memory by said load command is stored in said storage buffer, if a vacant entry exists in said storage buffer, said load data is stored in said vacant entry by said load command;
if no vacant entry exists in said storage buffer, and any entries in which load data is stored exist in said storage buffer, said load data is stored in any one of said entries by said load command; and
if no vacant entry exists in said storage buffer, and no entries in which load data is stored exist in said storage buffer, said load is not stored in said storage buffer by said load command.

2. A memory device comprising a storage buffer which temporarily maintains store data for a cache memory or a main memory, wherein, if load data has been read out from said cache memory by a load command, said load data in stored in said storage buffer; and wherein, when store data is stored in said storage buffer by a store command:
if an entry exists in said storage buffer in which store data or load data are stored of which the address is identical to the subject address of said store command, then said store data is stored in said entry by said store command; and
if no entry exists in said storage buffer in which store data or load data are stored of which the address is identical to the subject address of said store command, and a vacant entry exists in said storage buffer, and then said store data is stored in said vacant entry by said store command; and
if no entry exists in said storage buffer in which store data or load data are stored of which the address is identical to the subject address of said store command, and no vacant entry exists in said storage buffer, and any entry exists in said storage buffer in which load data is stored, then said store data is stored by said store command in any one of said entries in which load data is stored.

* * * * *